Nov. 5, 1940.     V. R. STEWART     2,220,586
POWER REVERSE GEAR
Filed Nov. 30, 1937     2 Sheets-Sheet 1
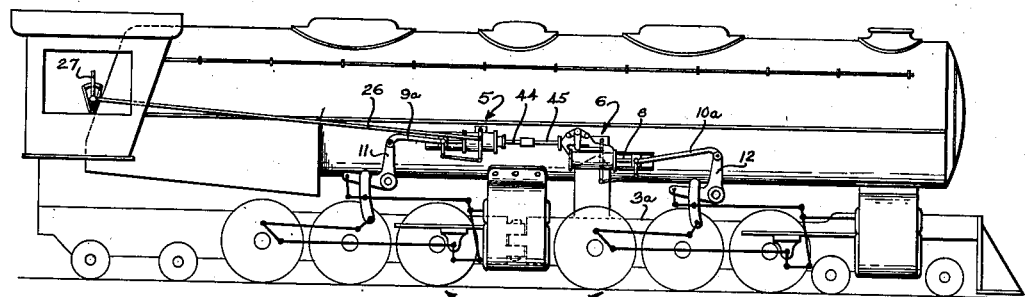
Fig. 1
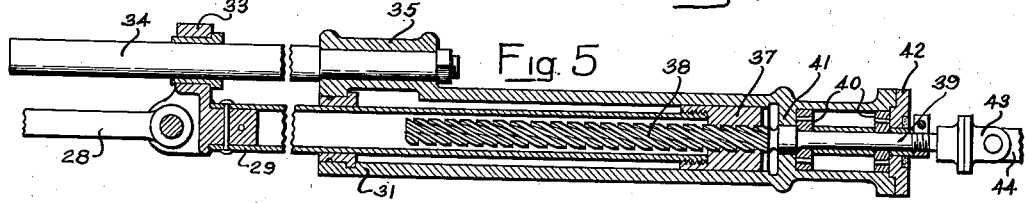
Fig. 5
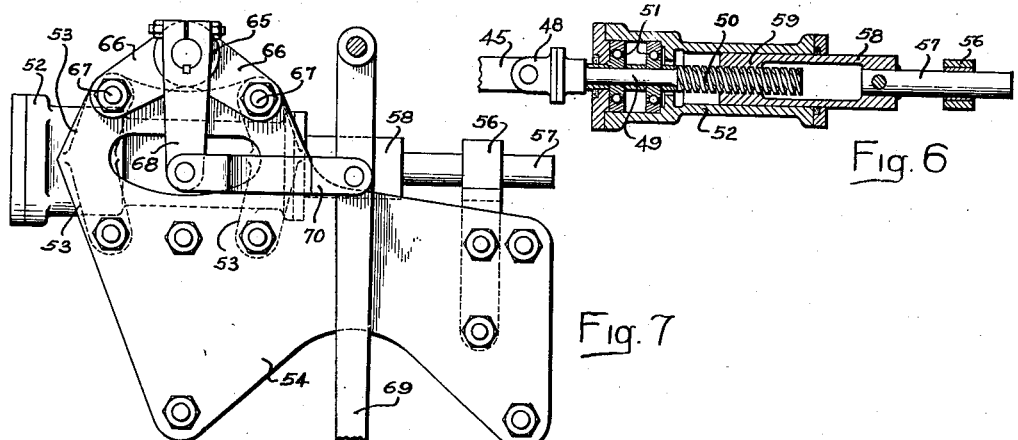
Fig. 6
Fig. 7
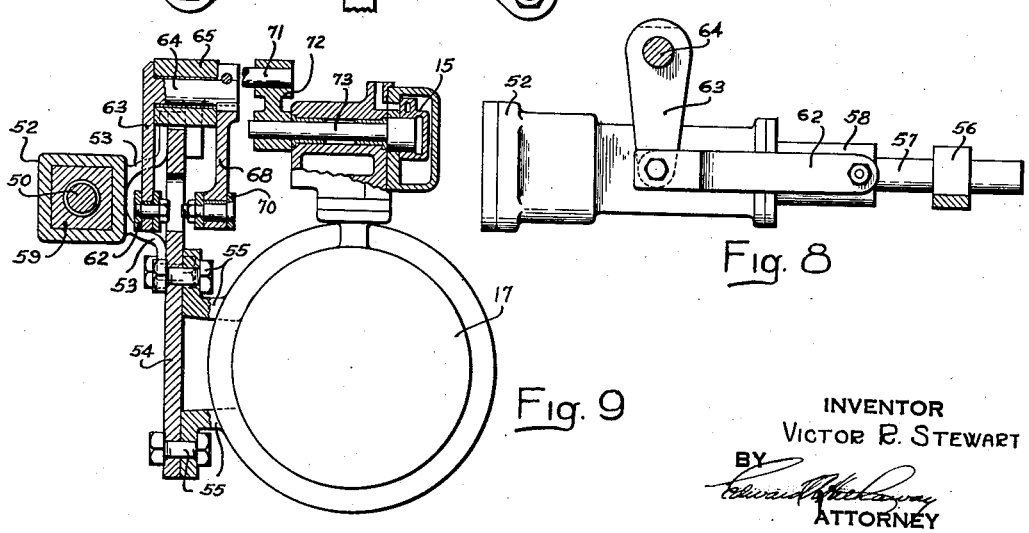
Fig. 8
Fig. 9
INVENTOR
VICTOR R. STEWART
BY
ATTORNEY Nov. 5, 1940. V. R. STEWART 2,220,586
POWER REVERSE GEAR
Filed Nov. 30, 1937 2 Sheets-Sheet 2

INVENTOR
Victor R. Stewart
BY
ATTORNEY

Patented Nov. 5, 1940

2,220,586

UNITED STATES PATENT OFFICE 2,220,586

POWER REVERSE GEAR

Victor R. Stewart, Glenside, Pa.

Application November 30, 1937, Serial No. 177,235

10 Claims. (Cl. 105—48)

This invention relates generally to power reverse gears for simple expansion articulated locomotives and more particularly to means for adjusting and controlling a pair of power reverse motors respectively connected to the valve gears of the forward and rear driving wheel units.

In articulated type locomotives the rear driving wheel unit normally has a fixed relation to the locomotive frame while the forward articulated driving unit is arranged to have appreciable relative movement with respect to the main frame. Various arrangements have heretofore been proposed and used for controlling the valve gears of the respective driving units whereby the engineer may adjust and control both gears from a common operating lever or wheel in the locomotive cab, but these prior arrangements have been deficient in various respects including among others excessive effort to adjust the plurality of power reverse gears for the two sets of driving units, or of not providing sufficient flexibility and accuracy of operation and control, or of being excessively complicated together with requiring an excessive amount of space.

It is an object of my invention to provide improved means for initiating operation and control of the respective power reverse gears and particularly the distributing valves therefor. A further object is to provide improved means for effecting manual adjustment of one power reverse gear and power adjustment of the other power reverse gear. A further object is to provide improved means whereby the distributing valves of the respective power reverse gears may be as effectively and fully actuated and controlled through individual follow-up mechanisms as though only a single power reverse gear were employed.

Another object is to provide an improved duplex adjusting and control system for the respective power reverse gears that will require minimum space and operating elements consistent with performing accurate and positive control of the power reverse gears. Another object is to provide improved mechanism for transmitting an adjusting force from one power reverse gear to the distributing valve of the other reverse gear while at the same time permitting such distributing valve to be restored to its neutral position through its own follow-up mechanism. Another object is to provide improved means for transmitting an operating force from one power reverse gear to the distributing valve of the other reverse gear while at the same time effectively locking in any adjusted position the operating elements which initially displace the distributing valve from its neutral position.

A still further object is to provide for a plurality of power reverse gears an improved control and operating mechanism that is economical in construction, operation and maintenance and is efficient, accurate and sensitive in maintaining the power reverse gears in any predetermined selected position and in maintaining the power reverse gears in complete cooperation with each other so that the front and rear locomotive driving units will produce the same power but at the same time permit each power reverse gear to be independent in its respective movements during adjustment of the valve gears and to independently absorb any vibrating action or forces.

Other objects and advantages will be more apparent to those skilled in the art from the following description of the accompanying drawings in which:

Fig. 1 is a side elevation of a locomotive diagrammatically illustrating the application thereto of my improved power reverse gear system;

Fig. 5 is an enlarged vertical sectional view through the primary screw and operating mechanism associated with the rear power reverse gear, taken on the line 5—5 of Fig. 2;

Fig. 6 is a vertical sectional view of the secondary screw and elements associated with the forward power reverse gear, this figure being in effect a continuation of the right end of Fig. 5 and taken on the line 6—6 of Fig. 2;

Fig. 7 is a longitudinal vertical section taken on the line 7—7 of Fig. 2;

Fig. 8 is a similar section taken on the line 8—8 of Fig. 2;

Fig. 9 is a transverse section taken on the line 9—9 of Fig. 2.

Figure 2:
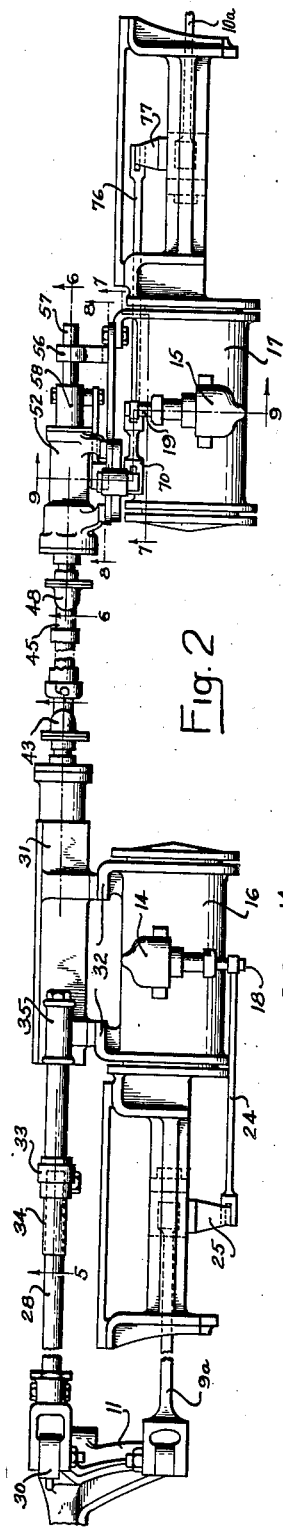
Fig. 2 is a plan view of the power reverse gears detached from the locomotive.

In the particular embodiment of the invention, such as is disclosed herein merely for the purpose of illustrating one specific form among possible others that the invention might take in practice, I have shown the same applied to a conventional type of articulated locomotive having a rear power driving unit generally indicated at 2 and a forward articulated power driving unit generally indicated at 3. These power units are of the simple expansion type each having its own valve gear respectively adjusted and controlled by separate power reverse gears generally indicated at 5 and 6. The details of construction of the locomotive, its driving units and valve gears are well known in the art and hence need not be further described. Also the power reverse gears per se specifically shown are of the well-known fluid operated piston and cylinder type whose piston rods 7 and 8 are connected through crossheads 9 and 10 to bellcranks 11 and 12 respectively of the rear and forward valve gears. Links 9a and 10a connect the crosshead with the bellcranks which are mounted on usual fixed axes. The rear power reverse is supported in fixed relation to the rear driving unit while the forward power reverse is carried by the usual articulated frame 3a so as to be movable therewith relative to the boiler.

Usual distributing valves or power control means diagrammatically indicated at 14 and 15 are mounted on top of the respective power reverse cylinders 16 and 17. The distributing valves may be of any usual form well known in the art and hence need not be further described. Valve 14, however, is located with its valve shaft 18 projecting outwardly while valve 15 has its valve shaft 19 projecting inwardly as shown in the plan view of Fig. 2.

Figure 3:
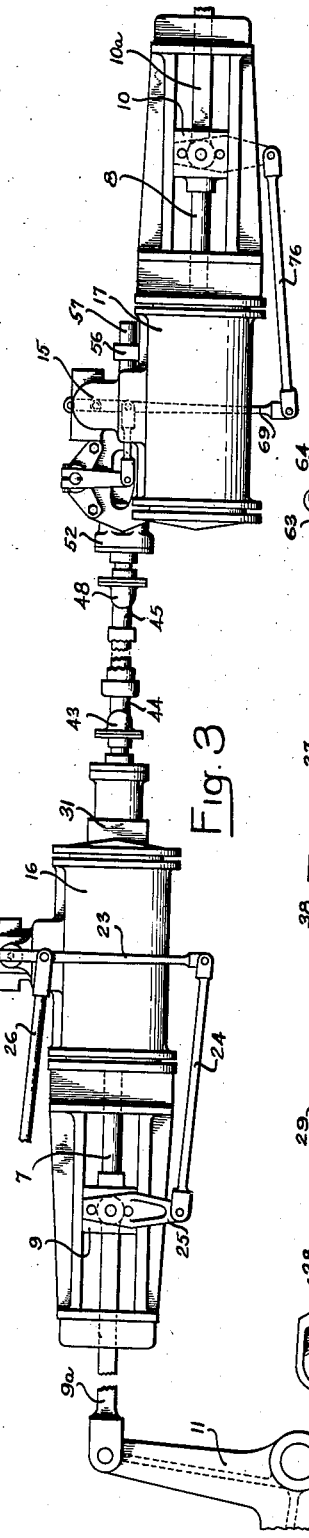
Fig. 3 is a side view of Fig. 2.
Figure 4:
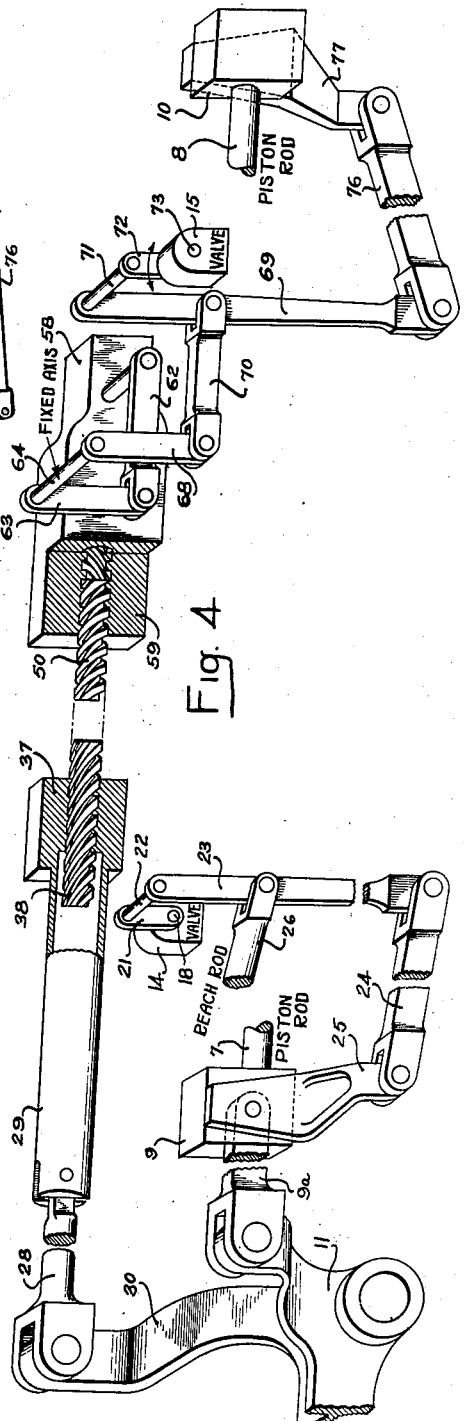
Fig. 4 is a diagrammatic perspective of the principal operating links and elements embodied in my improved control.

As shown in Figs. 2, 3 and 4, an arm 21 is secured to valve shaft 18 which in turn is connected by a pivot pin 22 to a floating lever 23. As is usual, a restoring link 24 connects the lower end of floating lever 23 to piston rod 7 specifically through a bracket 25 secured to the crosshead 9 while a reach rod 26 is connected to floating lever 23 for operation thereof by a usual manual cab lever 27, Fig. 1. The operation of this rear power reverse gear is therefore the same as in usual practice, namely, that adjustment of cab lever 27 shifts floating lever 23 to rotate valve stem 18 whereupon movement of piston rod 7 causes link 24 to swing floating lever 23 about its pivotal connection with reach rod 26, thereby to restore valve stem 18 and its valve to neutral.

Minimum manual effort is required on the part of the engineer to effect the foregoing adjustment of the rear power reverse gear. To avoid the necessity for any additional manual effort on the part of the engineer to adjust the forward power reverse and at the same time to insure accurate and sensitive adjustment thereof, I have provided a power transmitting connection between the rear power reverse motor and the distributing or control valve of the forward power reverse. This connection includes as shown in Figs. 2, 4 and 5 a link 28 pivotally connecting the rear end of a sleeve 29 with an arm 30 formed preferably integrally with rear bellcrank arm 11. Sleeve 29 is non-rotatably slidably supported in a stationary guide housing 31 bolted to suitable flanges 32, Fig. 2, on the inner side of rear cylinder 16. Sleeve 29 is further guided at its outer end by a crosshead arm 33 slidably supported upon crosshead guide rod 34 with is secured to a suitable lug 35 on the guide housing. Secured to the inner end of sleeve 29 and guided by housing 31 is a primary nut 37 which is prevented from rotating by the crosshead arm and guide 33 and 34. A primary screw 38 of considerable pitch cooperates with nut 37 and has a shaft extension 39 journalled in bearings 40 located in the front end of housing 31, the bearing chamber having an end wall 41 and a removable cover plate 42. Shaft 39 is connected through a universal joint 43 to a shaft 44 which has a telescopic splined connection with an outer shaft 45, the splined connection being of any usual and well known construction to permit an extensible driving connection between the two shafts for the purposes herein of allowing the forward driving unit 3 and power reverse gear 6 supported by the frame thereof to have free articulated movement relative to the main locomotive frame. Rod 45 is connected through a second universal joint 48 which is secured to the shaft end 49 of a secondary screw 50. The shaft 49 is journalled in bearings 51 supported in a combined housing and guide 52. This housing as shown in Figs. 7 and 9 is supported through arms 53 by a plate 54 which in turn is secured by bolts and arms 55, Fig. 9, to the inner side of front power reverse cylinder 17. As shown in Fig. 7, supporting plate 54 is of irregular shape for the purpose of accommodating the floating lever and operating links for the forward power reverse gear. Also bracket plate 54 rigidly supports a crosshead guide arm 56 for supporting and guiding a crosshead rod 57 which is secured to a sleeve 58, Fig. 6. This sleeve is non-rotatably but axially slidable in housing 52 and has a nut 59 threaded on screw 50.

To adjust distributing valve 15 of the front power reverse motor by axial movement of sleeve 58, the latter as shown in Figs. 4 and 8 is pivotally connected by a link 62 to an arm 63 which is secured to a cross shaft 64 mounted for oscillation about a fixed axis in a bearing 65, Figs. 7 and 9. Bearing 65 has two downwardly inclined arms 66 secured to supporting plate 54 by bolts 67. Secured to shaft 64 at its outer end is an arm 68 preferably of the same length as arm 63 and pivotally connected at its lower end to a floating lever 69, Figs. 4 and 7, through which might be termed a secondary reach rod 70. Floating lever 69 is pivotally connected through a pin 71 to a valve actuating arm 72, this arm being secured to the inner end of a valve shaft 73 of distributing valve 15. Pivotal connection 71 is similar in its operation to pivotal connection 22, Fig. 4, of the rear power reverse gear, these two connections being supported solely by their arms 21 and 72 so as to bodily move in an arcuate path upon adjustment of the distributing valve and during the subsequent follow-up or restoring action thereof.

*Operation.*—The engineer adjusts cab lever 27, Fig. 1, to such a position as will give a desired degree of cut-off and the cab lever is held in such position by a usual notched quadrant. Movement of lever 27 causes reach rod 26 to move floating lever 23, Fig. 4, about its lower pivot as a fulcrum thereby angularly adjusting valve shaft 18 of the rear power reverse gear. Steam or air as the case may be is supplied and exhausted through the valve to actuate the power reverse piston with consequent movement of piston rod 7 and bellcrank arm 11 thereby adjusting the valve gear of the rear driving unit 2. Movement of piston rod 7 is transmitted through restoring link 24 to move the lower end of floating lever 23 about its pivotal connection with reach rod 26, thereby restoring the valve 14 and its shaft 18 to neutral position. The power reverse gear 5 will maintain its newly adjusted position until the engineer again adjusts the cab lever 27 to a new position. The foregoing operation is usual and well-known in the art. However, when piston rod 7 moves bellcrank arm 11, the other arm 30 connected thereto causes link 28 to move longitudinally and similarly move, Figs. 4 and 5, sleeve 29 and primary nut 37. The primary screw 38, by reason of its steep pitch, will rotate in response to axial movement of nut 37, thereby rotating shafts 39, 44, 45 and 49 to cause rotation of screw 50 of the forward power reverse gear. Thereupon non-rotatable nut 59, whose outer surface is preferably square in cross-section so as to be non-rotatably but axially slidably supported by housing 52, shifts sleeve 58 which is adequately laterally supported by rod 57 and guide arm 56. Sleeve 58 in turn moves link 62 to pivotally move arms 63 and 68 about the fixed axis of shaft 64, thereby causing secondary reach rod 70 to swing floating lever 69 about its lower pivotal connection with restoring link 76. Accordingly the upper end of floating lever 69 causes shaft 71 and arm 72 to be angularly displaced to adjust valve shaft 73 and valve 15. The forward power reverse motor is thereupon supplied with operating fluid so as to move its piston and rod 8 and cause link 10a to move bellcrank 12 to adjust the valve gear of the forward driving unit 3. Movement of piston rod 8 is in turn transmitted through crosshead bracket 77 to link 76 so as to reversely swing floating lever 69 about its pivotal connection with secondary reach rod 70, thereby moving shaft 71, arm 72 and valve shaft 73 to restore valve 15 to its neutral position. The screw 50, Fig. 6, is preferably a triple thread although its pitch is such that sleeve 58 is locked in axial position when rotation of screw 50 ceases. The screw 50 and its nut 59 thereby perform the locking function of a notched cab lever quadrant notwithstanding that the elements of the forward power reverse motor are not directly connected thereto. Articulated movement of the front driving unit 3 relative to the rear driving unit 2 will not in any way disturb the adjustment of the forward power reverse gear. Also the independent locking and operating action of screw 50 and nut 59 will not be disturbed by any extension of the telescopic splined shafts 44 and 45 which are flexibly connected to the screws 38 and 50 through universal joints 43 and 48.

From the foregoing disclosure it is seen that I have provided an extremely effective duplex control system for operating power reverse gears for the forward and rear driving units of an articulated locomotive, my improved system and apparatus permitting both power reverse gears to be adjusted with no more effort on the part of the engineer than is required to operate a single gear and yet both gears are adapted to have their own independent restoring action whereby any sluggishness and creeping action of the forward gear will not in any way affect the operation of the rear power reverse gear. My improved system also permits standard power reverse gears to be employed and for each to have its own independent standard mode of operation and restoring action through the respective floating levers and follow-up connections with the piston rods. By virtue of the self-locking action of the actuating means 50 and 59, Fig. 6, maximum flexibility of movement may be allowed between the forward and rear power reverse gears. The various links, arms and screws are of course so proportioned that for a given movement of the cab lever, both power reverse gears are adjusted to the same extent.

It will of course be understood that various changes in details of construction and arrangement of parts may be made by those skilled in the art without departing from the spirit of the invention as set forth in the appended claims.

I claim:

1. A locomotive power reverse gear system having two power reverse gears, means for manually initiating during operation of the locomotive predetermined variable positions of cut-off of one of said gears, means operated by power from said latter gear for initiating corresponding positions of cut-off of the second power reverse gear, and means whereby both of said power reverse gears can be stopped at corresponding predetermined positions of cut-off.

2. A locomotive power reverse gear system comprising, in combination, two power reverse gears, means for initiating operation of one of said gears, means operated by power from said latter gear for initiating operation of the second power reverse gear, and each power reverse gear having its own individual follow-up means for stopping operation of each of said power reverse gears in accordance with any desired degree of cut-off.

3. A locomotive power reverse gear system comprising two power reverse gears each provided with a distributing valve and a floating lever together with a follow-up mechanism for restoring the valve to its neutral position upon gear movement, means for initiating operation of one of said power reverse gears, and means actuated by power from said latter gear for initiating operation of the second gear.

4. A locomotive power reverse gear system comprising two power reverse gears each provided with a distributing valve, manual means for initiating adjustment of one of said distributing valves, means for causing the other of said distributing valves to be operated in dependent relation to the first valve, and means for restoring each of said valves to its respective neutral position when any selected one of various degrees of cutoff is obtained.

5. A locomotive power reverse gear system comprising two power reverse gears each of the piston and cylinder type having a distributing valve, means for initiating adjustment of the distributing valve for one of said gears, a primary screw and nut of such pitch that relative axial movement between the same causes rotation of one thereof, means for effecting said relative axial movement in response to operation of one of said power reverse gears, and means operated by the rotatable one of said screw and nut elements for actuating the distributing valve of the other of said power reverse gears.

6. A locomotive power reverse gear system comprising two power reverse gears each of the piston and cylinder type having a distributing valve, means for initiating adjustment of the distributing valve for one of said gears, a primary screw and nut of such pitch that relative axial movement between the same causes rotation of one thereof, means for effecting said relative axial movement in response to operation of one of said power reverse gears, a secondary screw and nut rotated relative to each other by the rotatable one of said primary screw and nut elements thereby to effect relative axial movement between said secondary screw and nut, and means connected to the axially movable element of said secondary screw and nut for adjusting the distributing valve of the second power reverse gear.

7. The combination set forth in claim 6 further characterized in that the pitch of the secondary screw and nut allows relative axial movement therebetween by applying a rotating force to the screw but relative axial movement cannot be effected by applying an axial force to the nut thereby positively locking said secondary elements in any position to which they are adjusted.

8. A locomotive power reverse gear system having two power reverse gears each having a power actuated element and a power control valve, means for initiating adjustment of the control valve for one of said reverse gears, a primary screw and nut of relatively large pitch whereby axial movement of the nut effects rotation of the screw, means for moving said primary nut by power from said first power reverse gear, a secondary screw rotatably driven by said primary screw, and a nut engageable with and axially moved by said secondary screw for adjusting the control valve of the second power reverse gear.

9. A locomotive power reverse gear system for an articulated locomotive having a rear fixed driving unit and a forward driving unit adapted for articulated movement comprising, in combination, a pair of power reverse gears one of which is carried in substantially fixed relation to the rear driving unit and the other of which is carried by the forward articulated driving unit, each of said power reverse gears having its own distributing valve and follow-up mechanism therefor, means for manually initiating adjustment of the distributing valve for one of said power reverse gears, and flexible means driven by said latter power reverse gear for initiating adjustment of the distributing valve of the second power reverse gear.

10. A locomotive power reverse gear system for a locomotive having a fixed rear driving unit and a forward articulated driving unit comprising, in combination, a pair of power reverse gears, one of which is supported in fixed relation to said rear unit and the other of which is carried by the forward movable driving unit, each of said power reverse gears having its own piston and cylinder and distributing valves and restoring mechanisms respectively therefor, and means for causing one of said power reverse gears to be operated in dependent relation to the other power reverse gear but the restoring mechanisms of the respective power reverse gears having their own independent operation in response to actuation of their respective power reverse gear.

VICTOR R. STEWART.